(12) United States Patent
Johnson

(10) Patent No.: US 10,024,408 B2
(45) Date of Patent: Jul. 17, 2018

(54) HYBRID DRIVE SYSTEM

(71) Applicant: New Hybrid Technologies, LLC, Knoxville, TN (US)

(72) Inventor: David B. Johnson, Knoxville, TN (US)

(73) Assignee: New Hybrid Technologies, LLC, Knoxville, TN (US)

( * ) Notice: Subject to any disclaimer, the term of this patent is extended or adjusted under 35 U.S.C. 154(b) by 122 days.

(21) Appl. No.: 14/379,295

(22) PCT Filed: Aug. 1, 2013

(86) PCT No.: PCT/US2013/053282
§ 371 (c)(1),
(2) Date: Aug. 16, 2014

(87) PCT Pub. No.: WO2014/022698
PCT Pub. Date: Feb. 6, 2014

(65) Prior Publication Data
US 2015/0152948 A1    Jun. 4, 2015

Related U.S. Application Data

(60) Provisional application No. 61/678,682, filed on Aug. 2, 2012.

(51) Int. Cl.
| | |
|---|---|
| *F16H 41/04* | (2006.01) |
| *F02B 73/00* | (2006.01) |
| *B60K 6/26* | (2007.10) |
| *B60K 6/405* | (2007.10) |
| *F16H 41/30* | (2006.01) |
| *F16H 57/04* | (2010.01) |
| *B60K 6/48* | (2007.10) |

(52) U.S. Cl.
CPC ............... *F16H 41/04* (2013.01); *B60K 6/26* (2013.01); *B60K 6/405* (2013.01); *F02B 73/00* (2013.01); *F16H 41/30* (2013.01); *F16H 57/0412* (2013.01); *F16H 57/0476* (2013.01); *B60K 2006/4825* (2013.01); *B60Y 2400/426* (2013.01); *Y02T 10/6252* (2013.01)

(58) Field of Classification Search
CPC .. B60K 6/26; B60K 6/405; B60K 2006/4825; F02B 73/00; F16H 41/04; F16H 41/30; F16H 57/0412; F16H 57/0476; Y02T 10/6252; H02N 2/009; B60Y 2400/426
USPC .......................................................... 310/52
See application file for complete search history.

(56) References Cited

U.S. PATENT DOCUMENTS

| | | | | |
|---|---|---|---|---|
| 3,801,843 A | * | 4/1974 | Corman | ............... F28D 15/0275 |
| | | | | 165/104.25 |
| 4,712,030 A | * | 12/1987 | Lakin | ..................... H02K 11/33 |
| | | | | 165/80.3 |
| 6,625,983 B2 | * | 9/2003 | Kawasaki | ............... F16D 31/02 |
| | | | | 60/468 |
| 6,781,272 B2 | | 8/2004 | Kahlon et al. | |
| 8,182,391 B2 | | 5/2012 | Klemen et al. | |

(Continued)

*Primary Examiner* — Logan Kraft
(74) *Attorney, Agent, or Firm* — Rick Barnes

(57) ABSTRACT

A hybrid torque converter that includes a torque converter and an electric motor disposed within a common casing, with no intervening casing, where both the torque converter and the electric motor are completely immersed in a common circulating fluid that cools both the torque converter and the electric motor.

20 Claims, 1 Drawing Sheet

(56) References Cited

U.S. PATENT DOCUMENTS

| | | | |
|---|---|---|---|
| 8,371,984 B2* | 2/2013 | Diemer | F16H 3/66 475/289 |
| 8,395,288 B2* | 3/2013 | Huynh | H02K 9/00 310/52 |
| 8,622,182 B2* | 1/2014 | Iwase | B60K 6/26 180/65.26 |
| 2007/0099750 A1 | 5/2007 | Hickam | |
| 2010/0057310 A1 | 3/2010 | Hopp | |
| 2010/0314185 A1 | 12/2010 | Schoenek | |
| 2011/0010063 A1 | 1/2011 | Ota et al. | |
| 2012/0041621 A1 | 2/2012 | Marus et al. | |

* cited by examiner

HYBRID DRIVE SYSTEM

This application claims rights and priority on prior pending PCT application PCT/US2013/053282 filed 2013 Aug. 1, which claims priority on U.S. provisional patent application Ser. No. 61/678,682 filed 2012 Aug. 2, the entirety of the disclosure of which is incorporated herein by reference. This invention relates to the field of motor vehicle drive systems. More particularly, this invention relates to an integrated hydrodynamic electric hybrid drive system.

FIELD

Introduction

Hybrid vehicles are so-named because they contain two (or more) different types of motive sources that are used together in some way. Typically, one of these motive sources is an internal combustion engine (generally referred to in an abbreviated form herein as an "engine"), such as a gasoline-powered engine, and the other is an electric motor (generally referred to in an abbreviated form herein as a "motor"). Motors and engines are both generally referred to herein as "motive sources." The motive sources can be used to propel the vehicle, either alone or in combination.

The appeal of a hybrid vehicle is typically two-fold—first, electricity can typically be both produced and consumed in a much more ecologically-friendly manner than other fuels, and second, using an alternate fuel source such as electricity tends to reduce the dependence on fossil fuel providers and avoid the instabilities in those markets.

Unfortunately, the designs of hybrid vehicles that have been proposed and developed in the past tend to include a variety of characteristics that have made them relatively expensive to adopt.

For example, many hybrid vehicles include a separate, additional, independent cooling system to cool the electric motor. The additional cooling system tends to increase the cost, weight, and complexity of the hybrid vehicle.

Some hybrid vehicles couple the electric motor to the engine in a manner that makes it difficult and complicated to decouple the engine from the drivetrain when braking the vehicle, and so the amount of energy that can be recovered in a regenerative braking cycle is reduced.

Other hybrid vehicles exhibit issues such as increased noise, vibration, and jerking that are caused by the clutches and actuators that couple the engine to, and decouple it from, the drivetrain. Reducing those problems and providing a driving experience that the consuming public expects tends to require complex and expensive control systems.

The production of hybrid vehicles tends to require extensive retooling of vehicle production lines, thus dramatically increasing the cost of producing the hybrid vehicles. Because hybrid vehicles have not sold as well as traditional vehicles, these costs have not been quickly recouped.

What is needed, therefore, is a system that reduces issues such as those described above, at least in part.

SUMMARY

The above and other needs are met by a hybrid torque converter that includes a torque converter and an electric motor disposed within a common casing, with no intervening casing, where both the torque converter and the electric motor are completely immersed in a common circulating fluid that cools both the torque converter and the electric motor.

In various embodiments according this aspect of the invention, the torque converter includes a pump and a turbine. In some embodiments, a first clutch rotationally locks the pump to the casing. In some embodiments, a second clutch rotationally locks the turbine to the casing. In some embodiments, a third clutch rotationally locks the pump to the turbine. In some embodiments, the motor includes a stator and a rotor. In some embodiments, the rotor is rotationally locked to the pump. In some embodiments, an air injector injects air into a gap between the stator and the rotor. In some embodiments, fins are disposed on at least one of the stator and the rotor, and assist to retain the air within the gap. In some embodiments, clutches are disposed within the common casing, where the clutches are also immersed in the common circulating fluid, which cools the torque converter, the electric motor, and the clutches.

According to another aspect of the invention there is described a hybrid torque converter that includes a torque converter having a pump and a turbine, and an electric motor having, a rotor, a stator, a gap between the rotor and the stator, an air nozzle for injecting air in the gap, and fins disposed on at least one of the rotor and stator for assisting to maintain the air within the gap. The torque converter and the electric motor are disposed within a common casing, with no intervening casing, where both the torque converter and the electric motor are completely immersed in a common circulating fluid that cools both the torque converter and the electric motor.

According to yet another aspect of the invention there is described a hybrid torque converter that includes a torque converter having a pump and a turbine, an electric motor having a stator and a rotor, and power transistors, all disposed within a common casing, with no intervening casing, where the torque converter, the electric motor, and power transistors are completely immersed in a common circulating fluid that cools all of the torque converter, the electric motor, and the power transistors.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

Figure 1:
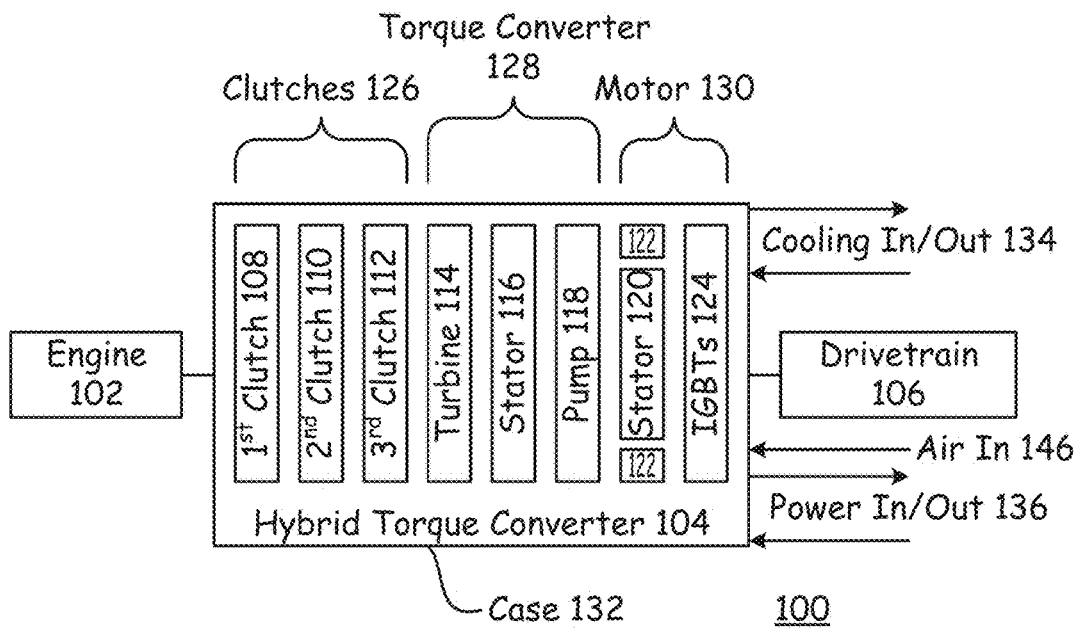
FIG. 1 is a functional block diagram of a vehicle incorporating a hybrid torque converter according to an embodiment of the present invention.

With reference now to the drawings, there are depicted various embodiments of the present invention, which combine the functions of electrical power generation and motive power transmission into a hybrid torque converter 104, in which the electric motor 130 is integrated with and disposed entirely within a torque converter housing 132. In some embodiments, the hybrid torque converter 104 has a generally cylindrical shape, and measures about 10 to 12 inches thick and about 10 to 12 inches in diameter and weighs about 100 pounds. In this manner, no significant additional space is required for the electric motor 130, and the hybrid torque converter 104 can be used in existing vehicle designs relatively easily, such as without significantly retooling a production line or as an aftermarket modification, by merely replacing a standard torque converter on the vehicle with the hybrid torque converter 104, and connecting cooling lines 134 and power lines 136.

Embodiments of the hybrid torque converter 104 perform the coupling and torque multiplication functions of a torque converter 128, but also provide motive power from the motor 130 to the drivetrain 106, and enable electrical power recovery as a generator through regenerative braking and inertial-powered or gravity-powered coasting. Combining these traditionally separate systems into one apparatus 104 reduces the complexity of the control systems, alleviates the constraints on the packaging of the apparatus 104, and improves the efficiency of the vehicle 100 in which it is incorporated. Further, various embodiments according to the present invention use the transmission lubrication and cooling systems as they exist in current vehicle designs.

According to various embodiments of the invention, an engine 102 is coupled to a hybrid torque converter 104, which is in turn coupled to a drivetrain 106. As introduced above, the engine 102 can take the form of an internal combustion engine, such as a gasoline engine, but could also be another type of engine, such as an external combustion engine, etc. The hybrid torque converter 104 performs the traditional functions of a torque converter, plus some additional functions, as described in more detail hereafter. The drivetrain 106, in various embodiments, includes one or more of a transmission, transfer housing, drive shaft, differential, and wheels.

The components depicted and described as residing within the case 132 are all in fluid communication one with another, are all completely immersed in a common fluid, and are all cooled or otherwise temperature controlled by that common fluid. In some embodiments the fluid is recirculated, such as through cooling fluid inlet and outlet stubs 134. In some embodiments, the cooling fluid is provided and circulated by the same pump and reservoirs that service the vehicle 100 transmission.

In some embodiments, a package of clutches 126 is included within the case 132, which selectively enables a variety of different modes for the hybrid torque converter 104, as described in more detail below. The clutches 126 take a variety of different forms in different embodiments, and need not all be of the same design. For example, roller clutches, element clutches, overrun clutches, single sided clutches, double sided clutches, and sprags can all be used in various combinations, as are known in the art. The torque converter 128 itself is also disposed within the casing 132, along with the motor 130.

With the electric motor 130 incorporated into the hybrid torque converter 104, the torque multiplication function of the torque converter 128 can be applied to the motive power provided by the electric motor 130. Torque multiplication is thus accomplished in a conventional pre-transmission configuration, with no external clutches to decouple the engine 102 from the drivetrain 106. Because the electric motor 130 is not directly coupled to the engine 102, the engine 102 can be decoupled from the drivetrain 106 to maximize the energy that is recovered from regenerative braking and coasting, as described elsewhere herein.

In various embodiments according to the present invention, the power transistors 124 (such as IGBTs, MOSFETs, inverters, or BJTs, for example) are inside the hybrid torque converter 104, and the outputs of the transistors 124 are connected directly to the windings of the motor 130. Direct current power is fed from the battery, through a safety relay called the main contactor, into the hybrid torque converter 104 by just two wires 136, with positive and negative polarities. This path 136 carries current from the battery to the hybrid torque converter 104 in power (drive) mode, and from the hybrid torque converter 104 to the battery in regeneration (charge) mode. In various embodiments, the battery is one or more of a standard automotive battery, a larger battery, or an array of batteries.

In various embodiments, the power transistors 124 are controlled by or exchange information with other on-board systems, such as via the vehicle's controller area network (CAN) bus. The power transistors 124 inside the hybrid torque converter 104 are cooled by the fluid inside the hybrid torque converter 104. The hybrid torque converter 104 is, in some embodiments, controlled by the on-board computer system for the vehicle 100.

In various embodiments, the torque converter 128 includes a pump 118, a stator 116, and a turbine 114. As the terms are used herein, the "pump" is the active, sending element and the "turbine" is the passive, receiving element, when they are operated in a standard mode with the engine 102 providing motive power to the drivetrain 106. In some nomenclatures the pump is referred to as the driving turbine or impellor, and the turbine is referred to as the driven turbine or impellor. In other references, the pump is the element that is typically tied to the engine, and the turbine is the element that is typically tied to the drivetrain. While some of these functions can be changed in different operational modes as described herein, the designations of pump and turbine for these two elements 118 and 114 will be retained throughout this description.

In some embodiments, a direct-drive clutch, generically depicted as the third clutch 112 in the drawings, connects the pump 118 to the turbine 114 in certain modes of operation, locking the two together, and thereby reducing losses in the transmission of motive power through the hybrid torque converter 104.

The motor 130 itself is, in some embodiments, a three-phase, permanent magnet, brushless electric motor with either an internal rotor design or an external rotor design (depicted). In some embodiments the motor 130 is designed to provide up to about 400 horsepower for short durations. In some embodiments the motor 130 is a 200 kilowatt motor.

The inside of the hybrid torque converter 104 housing 132, where the motor 130 is disposed, is substantially filled with transmission oil, such that the motor 130 is also substantially filled with transmission oil. When in operation, this fluid is circulated and thereby exchanged and refreshed with cooled fluid. Because of the extra heat that is generated by the motor 130 and its various components, such as the power transistors 124, the exchange rate for the cooling fluid is, in some embodiments, greater than that of a conventional torque converter. The flow in some embodiments is controlled by a computer, such as the on-board computer, based on criteria such as temperature, load, or projected load.

When the third clutch 112 is engaged, there is no slipping between the pump 118 and the turbine 114, which tends to reduce the amount of heat that is generated. Having the motor 130 immersed in this non-electrically conductive cooling fluid allows a greater amount of current to be run through the windings of the motor 130 without the key components overheating.

Figure 2:
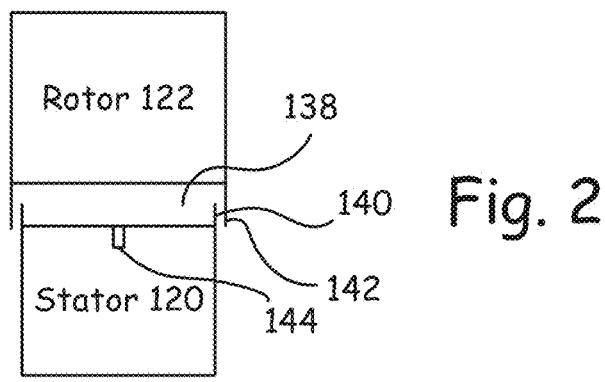
FIG. 2 is functional cross-sectional representation of an air gap between a motor rotor and a motor stator according to an embodiment of the present invention.

At various times during the operation of the hybrid torque converter 104, as explained in more detail hereafter, air is injected, such as through injector port 144, into the cooling oil in the gap 138 between the stator 120 and the rotor 122 to form an air gap 138, as depicted in FIG. 2. In some embodiments, this air gap 138 need not be created or maintained at low revolutions, but as the motor 130 speed increases to higher revolutions, such as at approximately 35 miles per hour or so, or after some period of continual running, injecting air into the gap 138 tends to reduce the drag on the motor 130 and increase its efficiency. Any air that might escape the gap simply combines with the recirculated cooling fluid and returns to the sump of the transmission to be vented. Air can be delivered to the hybrid torque converter 104 and to the stator 120 such as through an air in port 146.

In some embodiments, fins 140 are attached to the stator 120 and overlap with fins 142 that are attached to the rotor 122, and help maintain the injected air gap 128 between the stator 120 and the rotor 122. The fins 140 and 142 can be formed of metal or plastic rings that are attached to the stator 120 and the rotor 122, and in some embodiments do not touch each other. The fins 140 can be used without the fins 142, or the fins 142 can be used without the fins 140, or the fins 140 and 142 can be used in combination.

In some embodiments the power transistors 124 and other electronics are mounted directly onto heat sinks that are cooled by the fluid within the hybrid torque converter 104. The power transistors 124 are selected to be capable of handling the large currents that are present during acceleration, engine startup, and regenerative braking and coasting. In various embodiments, the power transistors 124 are directly connected to the windings of the electric motor 130, and the battery power is conducted directly to the power transistors 124 through the main support of the stators 120 and 116 using a high current, direct current bus 136. Accordingly, the power goes directly from the battery to the power transistors 124 during acceleration (drive mode), or from the power transistors 124 directly to the battery during regeneration (charge mode). In various embodiments, the power transistors 124 are controlled by the main onboard computer, which communicates, for example, through at least one of a high-speed bus and a fiber optic cable.

Various embodiments according to the present invention use current-sourced inverters 124. Prior art hybrids use voltage-sourced inverters, which require relatively large capacitor banks to store the electrical energy. Current-sourced inverters 124, by contrast, do not require such capacitor banks.

A description of the modes of operation according to an embodiment of the present invention is now presented. In some embodiments, the power transistors 124, motor stator 120, and torque converter 128 stator 116 are all fixed together at all times. The following table indicates the interaction between the clutches 126 and other elements of the vehicle 100 according to some embodiments:

| COU-PLING | ITEM 1 | ITEM 2 | DURA-TION | USE |
|---|---|---|---|---|
| Affixed | Pump 118 | Rotor 122 | Always | Transmits motive power from engine 102 to motor 130 in charge mode, from motor 130 to engine 102 in start mode, and from motor 130 to drivetrain 106 in accelerate or regeneration modes |
| Affixed | Case 132 | Engine 102 | Always | Transmit motive power from engine 102 to hybrid torque converter 104 in drive mode, and from hybrid torque converter |

-continued

| COU-PLING | ITEM 1 | ITEM 2 | DURA-TION | USE |
|---|---|---|---|---|
| | | | | 104 to engine 102 in start mode |
| Affixed | Turbine 114 | Drivetrain 106 | Always | Transmit motive power from either motor 130 or engine 102 in drive mode, and to motor 130 in regeneration mode |
| 3$^{rd}$ Clutch 112 | Pump 118 | Turbine 114 | Selectable | Eliminate slipping between pump 118 and turbine 114, such as at cruising speeds |
| 2$^{nd}$ Clutch 110 | Turbine 114 | Case 132 | Selectable | Transmit motive power from motor 130 to engine 102 in start mode |
| 1$^{st}$ Clutch 108 | Pump 118 | Case 132 | Selectable | Disengage engine 102 from hybrid torque converter 104, such as when engine 102 is off, for motor 130 to accelerate vehicle or motor 130 to use vehicle 100 inertia to regenerate battery |

As the vehicle accelerates on a normal takeoff, the engine 102 is off and not turning. The hybrid torque converter 104 is filled with circulating cooling fluid, such as with the use of a variable-speed electric pump. The flow rate of the cooling fluid in some embodiments is dependent upon factors such as the temperature of the cooling fluid dawn off of the hybrid torque converter 104, and the load on the hybrid torque converter 104. When the acceleration is increased, the rotation of the rotor 122 of the electric motor 130 starts to move the vehicle 100 by turning the pump 118. When a combination of the vehicle load and acceleration is sufficiently high, the start clutch, which locks the turbine 114 to the casing 132, and is generically depicted as the second clutch 110, is engaged and jump-starts the engine 102. At that point, both the electric motor 130 and the engine 102 are working together to accelerate the vehicle 100. When cruising speed is attained, the hybrid torque converter 104 applies the third clutch 112, locking the pump 118 and the turbine 114 together. The gap 138 between the stator 120 and the rotor 122 is flooded with air, thereby reducing the drag between the stator 120 and the rotor 122.

When the vehicle 100 encounters a downhill run and the accelerator position is decreased, both clutches 110 and 112 disengage, and the first clutch 108—which locks the pump 118 to the case 132, is also disengaged, thus disengaging the engine 102 from the hybrid torque converter 104, and the engine 102 is stopped. Current is returned to the battery as the vehicle 100 coasts down the hill, and the inertial forces of the vehicle 100 drive the motor 130. When the brake is applied, even more current can be delivered to the battery, because the drivetrain 106 is driving the turbine 114, thereby multiplying the torque and driving the pump 118, which is turning the magnets of the rotor 122 around the stator 120 coils, sending all of the current back through the power transistors 124 into the battery, and assisting to bring the vehicle 100 to a stop. This regenerative power can be used to start the vehicle 100, thereby reducing energy use and costs.

If the vehicle 100 is in slow-moving traffic, the electric motor 130 can be selectively activated, either automatically or manually, thereby relieving the engine 102. If the battery discharges below a certain point, the engine 102 can be started with the transmission in a neutral state, propel the vehicle 100, turn the pump 118, and charge the battery until a desired charge is attained.

When a reverse gear is selected, the transmission 106 reverses the rotation as normal. In some embodiments the electric motor 130 can supply all the rotational force that is required to propel the vehicle 100 backwards. If needed, the engine 102 can be selectively started to provide extra power for backing.

In various embodiments according to the present invention a conventional starter is retained to start the engine 102, in the event of some electrical power mode failure. The starter and hybrid torque converter 104 can drive the vehicle 100, even though power and acceleration would be limited. In other embodiments, a traditional starter is not included on the vehicle 100, and the starter functions of the hybrid torque converter 104 are used to start the vehicle 100, as described above.

The torque converter 128 in these embodiments generally functions as a standard torque converter 128, with various operational modes and clutches 126 as are known in the art. For example, when the 1$^{st}$ clutch 108 has the hybrid torque converter 128 engaged with the engine 102, then the pump 118 spins with the case 132 and the engine 102. Thus, engine 102 can drive the pump 118, which in turn drives the turbine 114, sending motive power out to the drivetrain 106. The rotor 122 in some embodiments is connected to and always spins with the pump 118. The stator 120 of the motor 130, the stator 116 of the torque converter, and the power transistors 124 of the motor 130 are, in some embodiments, all unitarily held in a rotationally stationary position while other elements of the hybrid torque converter 104 rotate around or in proximity to them.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A hybrid torque converter, comprising a torque converter and an electric motor disposed within a common casing, where both the torque converter and the electric motor are completely immersed in a common circulating liquid that cools both the torque converter and the electric motor.

2. The hybrid torque converter of claim 1, wherein the torque converter comprises a pump and a turbine.

3. The hybrid torque converter of claim 2, further comprising a clutch for rotationally locking the pump to the casing.

4. The hybrid torque converter of claim 2, further comprising a clutch for rotationally locking the turbine to the casing.

5. The hybrid torque converter of claim 2, further comprising a clutch for rotationally locking the pump to the turbine.

6. The hybrid torque converter of claim 2, wherein the motor comprises a stator and a rotor.

7. The hybrid torque converter of claim 6, wherein the rotor is rotationally locked to the pump.

8. The hybrid torque converter of claim 6, further comprising an air injector for injecting air into a gap between the stator and the rotor.

9. The hybrid torque converter of claim 8, further comprising fins disposed on at least one of the stator and the rotor, for assisting to retain the air within the gap.

10. The hybrid torque converter of claim 1, further comprising clutches disposed within the common casing, the clutches also immersed in the common circulating liquid, which cools the torque converter, the electric motor, and the clutches.

11. A hybrid torque converter, comprising:
a torque converter having a pump and a turbine, and
an electric motor having,
   a rotor,
   a stator,
   with a gap between the rotor and the stator, and
   an air nozzle for injecting air in the gap, and
   fins disposed on at least one of the rotor and stator for assisting to maintain the air within the gap,
the torque converter and the electric motor disposed within a common casing, where both the torque converter and the electric motor are completely immersed in a common circulating liquid that cools both the torque converter and the electric motor.

12. The hybrid torque converter of claim 11, further comprising a clutch for rotationally locking the pump to the casing.

13. The hybrid torque converter of claim 11, further comprising a clutch for rotationally locking the turbine to the casing.

14. The hybrid torque converter of claim 11, further comprising a clutch for rotationally locking the pump to the turbine.

15. The hybrid torque converter of claim 11, wherein the rotor is rotationally locked to the pump.

16. A hybrid torque converter, comprising a torque converter having a pump and a turbine, an electric motor having a stator and a rotor, and power transistors disposed within a common casing, where the torque converter, the electric motor, and power transistors are completely immersed in a common circulating liquid that cools all of the torque converter, the electric motor, and the power transistors.

17. The hybrid torque converter of claim 16, further comprising a clutch for rotationally locking the pump to the casing.

18. The hybrid torque converter of claim 16, further comprising a clutch for rotationally locking the turbine to the casing.

19. The hybrid torque converter of claim 16, further comprising a clutch for rotationally locking the pump to the turbine.

20. The hybrid torque converter of claim 16, wherein the rotor is rotationally locked to the pump.

* * * * *